(12) United States Patent
Tatura

(10) Patent No.: US 6,659,437 B2
(45) Date of Patent: Dec. 9, 2003

(54) RUBBER BEARING

(75) Inventor: Alfred Tatura, Damme (DE)

(73) Assignee: ZF Lemförder Metallwaren AG, Lemförde (DE)

( * ) Notice: Subject to any disclaimer, the term of this patent is extended or adjusted under 35 U.S.C. 154(b) by 94 days.

(21) Appl. No.: 09/958,080

(22) PCT Filed: Feb. 1, 2001

(86) PCT No.: PCT/DE01/00400
§ 371 (c)(1),
(2), (4) Date: Oct. 3, 2001

(87) PCT Pub. No.: WO01/57414
PCT Pub. Date: Aug. 9, 2001

(65) Prior Publication Data

US 2002/0159660 A1 Oct. 31, 2002

(30) Foreign Application Priority Data

Feb. 4, 2000 (DE) ......................................... 100 04 936

(51) Int. Cl.$^7$ ............................................... F16F 1/387
(52) U.S. Cl. ..................... 267/141; 267/279; 267/292
(58) Field of Search ................................ 267/141, 259, 267/292, 279–282, 140.12, 276, 153, 141.1–141.7, 293, 294; 384/220, 222, 125, 202; 16/2.1; 403/225–228; 248/638, 632, 609, 634, 635; 464/87, 88, 89–97

(56) References Cited

U.S. PATENT DOCUMENTS

| | | | |
|---|---|---|---|
| 4,634,108 A | * | 1/1987 | Munch |
| 5,338,012 A | * | 8/1994 | Kranick ........................ 267/292 |
| 5,489,087 A | * | 2/1996 | Bitschkus .................... 267/141 |
| 5,887,859 A | * | 3/1999 | Hadano et al. .......... 267/141.1 |
| 2002/0149146 A1 | * | 10/2002 | Lefebvre .................... 267/293 |
| 2002/0159660 A1 | * | 10/2002 | Tatura | |

FOREIGN PATENT DOCUMENTS

| | | | |
|---|---|---|---|
| DE | 28 38 391 A1 | | 3/1980 |
| DE | 33 46 665 A1 | | 7/1985 |
| DE | 10004936 A1 | * | 8/2001 |
| EP | 0472046 A1 | * | 2/1992 |
| FR | 2 715 446 | | 7/1995 |
| GB | 2285845 | * | 7/1995 |
| JP | 62220736 | | 9/1987 |
| WO | WO02/09959 A1 | * | 2/2002 |
| WO | WO 02/09960 A1 | * | 2/2002 |

* cited by examiner

Primary Examiner—Douglas C. Butler
(74) Attorney, Agent, or Firm—McGlew and Tuttle, P.C.

(57) ABSTRACT

A rubber bearing, preferably a simple rubber bearing, is provided with an essentially cylindrical inner part (1), a tubular outer sleeve (2) coaxially surrounding the inner part (1), as well as a pressure body, which is an elastomer (3). The elastomer (3) is arranged between the inner part (1) and the outer sleeve (2) and is connected to same by vulcanization. Two free grooves (4, 4') extend, beginning from the axial ends of the bearing, into the interior of the bearing in the axial direction over a complete circle around the bearing axis (5). The axial distance of the free grooves (4, 4') from the bearing axis (5) and/or whose width continuously changes cyclically, wherein there is a phase shift between the two free grooves (4, 4') in terms of their course, which is determined by the change in the radial distance from the bearing axis (5) and/or the width and which course preferably follows the same cycle. Strands (6, 6') of equal axial loadability in the pressure body formed by the elastomer (3) form a cross bond, so that the ratio of the radial rigidity to the axial rigidity is variable in bearings having otherwise the same basic design by setting the angles of the strands (6, 6') forming the cross bond in relation to the bearing axis (5) differently and/or by shaping the course of the contours of the free grooves (4, 4') differently.

20 Claims, 5 Drawing Sheets

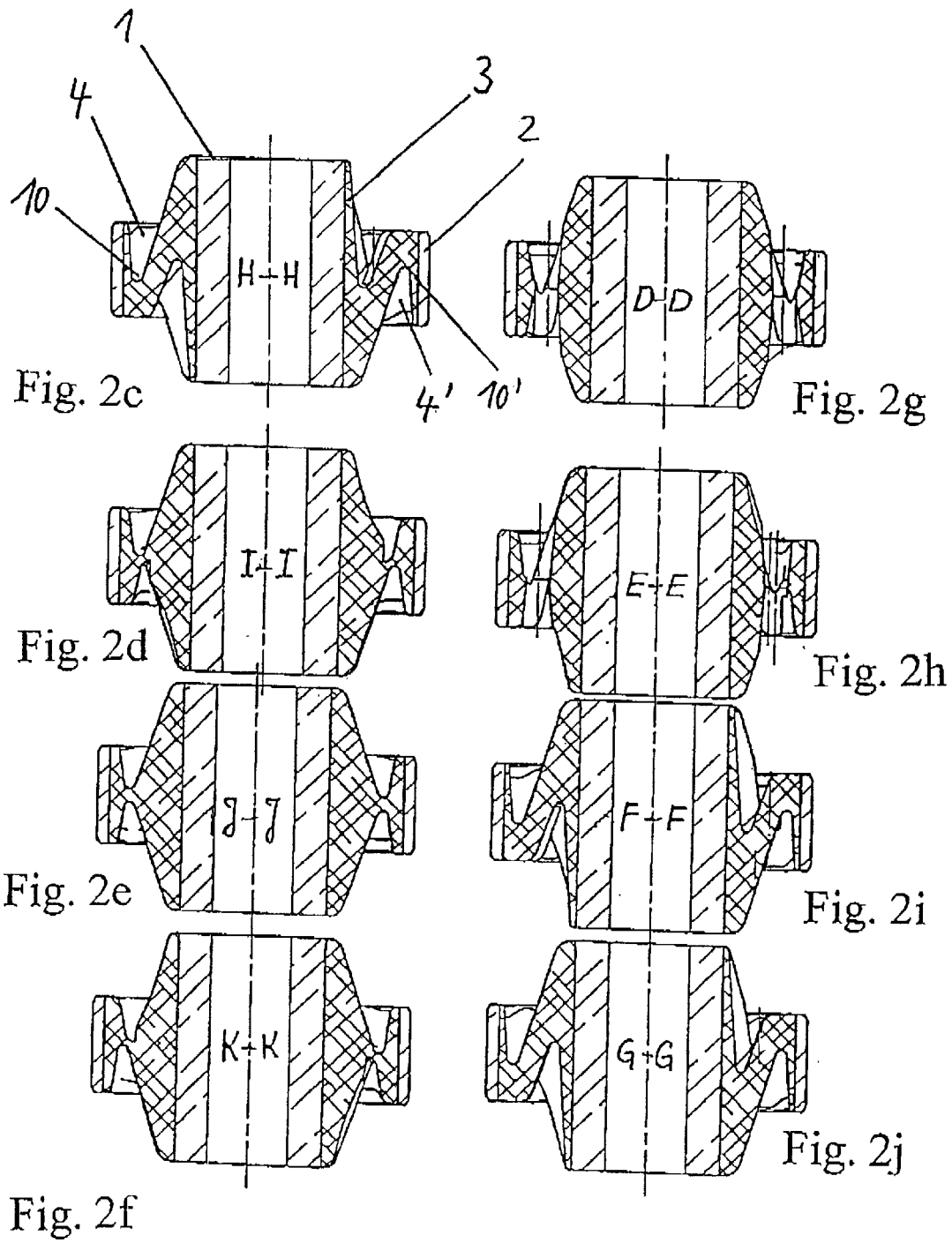

RUBBER BEARING

This is a 371 of PCT/DE 01/00400 filed Feb. 1, 2001.

FIELD OF THE INVENTION

The present invention pertains to a rubber bearing characterized by improved absorption of loads which occur as a consequence of torsion and cardanics. It preferably pertains to simple rubber bearings in which the coaxially arranged insert parts are adherently connected to one another by means of the elastomer. However, the general consideration of the present invention is also applicable to multipart rubber bearing or those in which additional insert parts or stop disk are provided for certain purposes.

BACKGROUND OF THE INVENTION

Rubber bearing are used for a very great variety of purposes mainly in the manufacture of vehicles. Depending on the particular intended use, greatly different requirements are imposed on the bearings in terms of loadability. In particular, bearings which are used in the area of the chassis, e.g., in connection with the wheel suspension, are also subject to a high load due to torsion or cardanics. It is therefore necessary the adapt the bearings to these loads in terms of their axial and radial rigidity.

Without additional measures, simple rubber bearings of the conventional design have a "natural" ratio of about 1:3 between the axial rigidity and the radial rigidity. To change this ratio in terms of a better adaptation to the cardanic loads or torsional stress which occur, it has hitherto been necessary to provide complicated insert parts or stop disks for the bearings. This leads to sometimes rather complicated designs. In addition, such parts will in turn lead to undesired limitations in other areas in terms of the conversion of torsion and cardanics. The complicated design leads to complicated manufacture and consequently high manufacturing costs. Furthermore, there are high expenses for the testing and the design of corresponding test set-ups. The assembly at the user, especially the accurate adjustment in terms of the directional loadability, is also comparatively complicated.

A rubber bearing which guarantees the improved absorption of forces introduced axially due to a special shape of its inner part and of the outer sleeve is described in DE 28 38 391 A1. The jacket surfaces of the inner part and of the outer sleeve are sloped against the axis of the bearing in this bearing. When axial forces are introduced, the inner part and the outer sleeve are radially displaced in relation to one another due to their special shape. However, a bearing designed according to this document cannot be considered for use for each intended purpose, especially concerning the shape of its outer sleeve.

An elastic bearing for absorbing cardanic deflecting movements has been known from DE 33 46 665 A1. According to the solution described, hollow recesses are prepared in the joint body on both front sides of the joint. As a result, there is restricted guiding for the joint body when cardanic deflecting movements occur.

SUMMARY AND OBJECTS OF THE INVENTION

The object of the present invention is to provide a rubber bearing which, having a simple design, can be varied within broad limits in terms of the ratio of the axial rigidity to the radial rigidity and can thus be adapted to the particular intended use, especially in terms of loads due to torsion and/or cardanics which may possibly occur.

The object is accomplished with a rubber bearing having the features of the principal claim. Advantageous variants and embodiments of the bearing according to the present invention are described by the subclaims.

The rubber bearing, which is preferably designed as a simple rubber bearing, comprises in the known manner an essentially cylindrical inner part, a tubular outer sleeve arranged coaxially around the inner part as well as a pressure body, which is formed by an elastomer, is arranged between the inner part and the outer sleeve and is connected to them by vulcanization. The inner part and the outer sleeve of such rubber bearings usually have a cylindrical shape. However, the shape may also deviate from this for certain applications; for example, the cross-sectional area may also have an elliptical shape or a shape similar to the elliptical, or the parts may have shoulders in the course of their axial extension. The applicability of the basic idea of the present invention remains unaffected hereby. In the manner according to the present invention, two free grooves of a special shape, which extend in the axial direction into the interior of the bearing and extend over a complete circle around the axis of the bearing, are prepared in the elastomer, beginning from the axial ends. The special shape of the free grooves is that their radial distance from the axis of the bearing and/or their width changes cyclically and that there is a phase shift in terms of their course, which is determined by the change in the radial distance from the axis of the bearing and/or the width. The course of both free grooves preferably follows the same cycle. In addition, the strands of equal axial loadability form a cross bond due to extending in alternating directions according to the present invention in the pressure body formed by the elastomer. The fact that the ratio of the radial rigidity to the axial rigidity can be varied in a very simple manner in bearings having otherwise basically the same design by setting the angles of the strands forming the cross bond in relation to the axis of the bearing and/or by a different shape of the course of the contours of the free grooves can be considered to be essential for the present invention. It is also within the scope of the present invention if, in addition, the axial depth of both free grooves relative to the circumference of the bearing varies and both protrude into the interior of the bearing beyond the axial center at least in some sections. The phase shift existing between their courses is selected to be such that the bottoms of the free grooves have a different radial distance from the axis of the bearing in the sections of the circumference of the bearing in which both free grooves extend beyond the center of the bearing. The ratio of the axial rigidity to the radial rigidity of the bearing can be set in the range of 1:3 to nearly 1:1 by correspondingly setting the angles of the strands forming the cross bond and/or the geometry of the free grooves.

Corresponding to a possible embodiment of the bearing, the cyclically changing distance between the free grooves and the axis of the bearing is determined by an approximately sinusoidal course of their inner contour. This inner contour is in turn determined by the particular material thickness of the elastomer in the area of its connection to the inner part of the bearing. Another possible embodiment is represented by a corresponding course of the outer contour of the free grooves. The material thickness of the elastomer likewise has a sinusoidal course in the area of its connection to the outer sleeve. This ensures a corresponding cyclic variation of the width of the free grooves. In addition, a combination of the two possibilities described above leads to an obvious possible embodiment due to the fact that both the inner contour and the outer contour of the free grooves have a sinusoidal course. Due to a corresponding phase shift between the two sinusoidal contour courses, this embodiment variant leads to free grooves in which the distance between the course of the free groove and the axis of the bearing changes according to a sinusoidal pattern while the width remains constant.

The sinusoidal course of the inner and/or outer contour of the free grooves advantageously extends over at least two cycles. This means that at least two points of maximum material thickness and two points of minimum material thickness of the elastomer are present in the course of the contour in the area of the connection between the elastomer and the inner part and/or the outer sleeve.

Particularly advantageous is an embodiment of the bearing in which the cross bond between the strands of equal axial loadability is designed such that a first strand of the contour of the free groove is connected to an axial end of the inner part of the bearing and the outer sleeve, while a second strand, which crosses the first one at an angle, is connected to the other axial end of the inner part of the bearing as well as to the outer sleeve. Corresponding to an advantageous variant of the bearing according to the present invention, axially extending openings may be provided in the pressure body formed by the elastomer. It is possible due to this measure to impart different radial rigidities to the bearing in its circumferential direction. Another advantageous possibility of influencing the behavior during torsion or cardanic load is offered by a variant of the bearing according to the present invention, in which local bulges are provided on the strands which determine the contours of the free grooves. These bulges make possible an even better distribution of the stresses occurring during torsion or cardanics in the bearing. These bulges are preferably provided for this purpose on the inner contour of the free grooves in the area surrounding the points of greatest material thickness of the elastomer in the area of its connection to the inner part. The present invention will be explained in greater detail below on the basis of an exemplary embodiment.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1b is an isometric view of the bearing according to FIG. 1a;

FIG. 1c is an axial section through the bearing according to FIG. 1a;

FIG. 2b is an isometric view of the bearing according to FIG. 2a;

FIG. 2c is a sectional view of the bearing with axial sections along the section line H—H according to FIG. 2a;

FIG. 2d is a sectional view of the bearing with axial sections along the section line I—I according to FIG. 2a;

FIG. 2e is a sectional view of the bearing with axial sections along the section line J—J according to FIG. 2a;

FIG. 2f is a sectional view of the bearing with axial sections along the section line K—K according to FIG. 2a;

FIG. 2g is a sectional view of the bearing with axial sections along the section line D—D according to FIG. 2a;

FIG. 2h is a sectional view of the bearing with axial sections along the section line E—E according to FIG. 2a;

FIG. 2i is a sectional view of the bearing with axial sections along the section line F—F according to FIG. 2a;

FIG. 2j is a sectional view of the bearing with axial sections along the section line G—G according to FIG. 2a;

FIG. 4b is an axial sectional view through the bearing according to FIG. 4a.

DESCRIPTION OF THE PREFERRED EMBODIMENTS

Figure 1A:
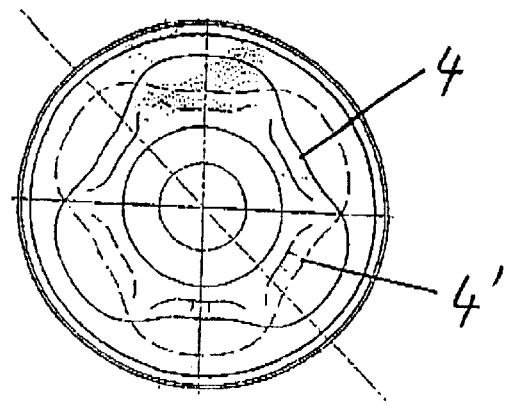
FIG. 1a is a top view of the bearing according to the present invention from the axial direction in a schematic view
Figure 1B:
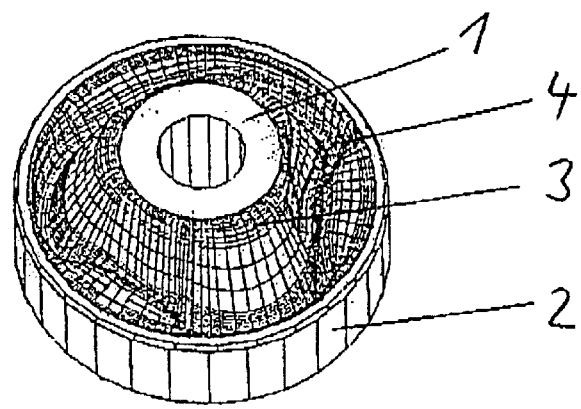

Referring to the drawings in particular, FIGS. 1a and 1b show the general design of a bearing designed corresponding to the present invention. FIG. 1a shows a simplified schematic view of a top view from the axial direction. The bearing according to FIG. 1a is shown in FIG. 1b once again in an isometric view. The bearing comprises, in the known manner, an essentially cylindrical inner part 1, a tubular outer sleeve 2 arranged coaxially with the inner part 1. A pressure body is arranged between the above-mentioned metallic parts. The pressure body, formed by the elastomer 3 or rubber, is connected to the inner part 1 and the outer sleeve 2 by vulcanization. The course of the free grooves 4, 4' formed in the two axial bearing halves is clearly recognizable in the figures. In the example shown, the distance between the free grooves 4, 4' and the bearing axis 5 varies in a sinusoidal pattern. As can be recognized, the course has three cycles. Consequently, three areas each with maximum material thickness of the elastomer 3 connected to the inner part 1 and three areas each with minimum material thickness are formed. The material thickness of the elastomer 3 also has a sinusoidal course in the area of the outer sleeve 2. However, the course of the material thickness is phaseshifted here relative to the course on the inner part 1. This is illustrated by FIG. 1a, in which the course of the free grooves 4, 4' in the bearing half located opposite the side shown in the view is indicated by broken line. Even though the distance between the free grooves 4, 4' and the bearing axis 5 varies in the exemplary embodiment being shown, their width remains the same over the entire course. This cannot be recognized from the schematic view in FIG. 1a, but is clearly illustrated by FIG. 1b. It is also recognizable that the course of the free groove 4' has a phase shift relative to the free groove 4.

Figure 1C:
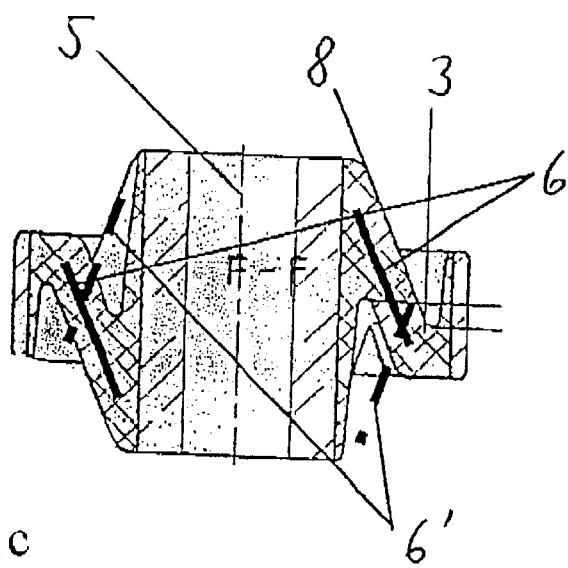

FIG. 1c shows a sectional view of the bearing according to FIGS. 1a and 1b. The course of the strands 6, 6' of the pressure body which form the cross bond is highlighted for better understanding. It becomes recognizable that a first strand 6 of the rubber contour 8 is bound at the upper axial end of the bearing and of the outer sleeve 2. A second strand 6', which crosses the first strand 6, is connected to the lower axial end and likewise to the outer sleeve 2. The ratio of the radial rigidity to the axial rigidity can be set by correspondingly setting the angle of the strands 6, 6' in relation to the bearing axis 5. The more acute this angle, the greater is the increase in the axial rigidity. If the course of the free grooves 4, 4' is also designed correspondingly at the same time, a ratio of approximately 1:1 can be set for the ratio of the radial loadability to the axial loadability. The extent to which the radial rigidity is reduced by the free grooves 4, 4' overlapping in the axial direction becomes very clear from the sectional view in FIG. 1c. Due to the phase shift of the course of the free grooves 4, 4', the bottoms 10, 10' of the free grooves 4, 4', which intersect relative to the axial extension, have a different radial distance from the bearing axis 5. As a result, the cohesion of the pressure body is guaranteed and its thickness is reduced at the same time. The characteristic of the bearing becomes softer in the radial direction as a result.

Figure 2A:
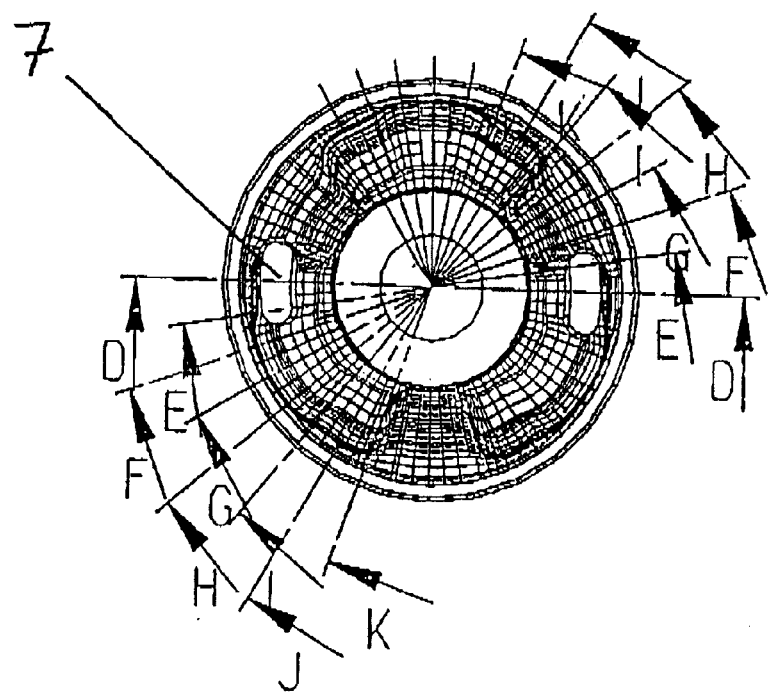
FIG. 2a is a top view of an embodiment of the bearing according to the present invention from the axial direction with various section lines indicated.
Figure 2B:
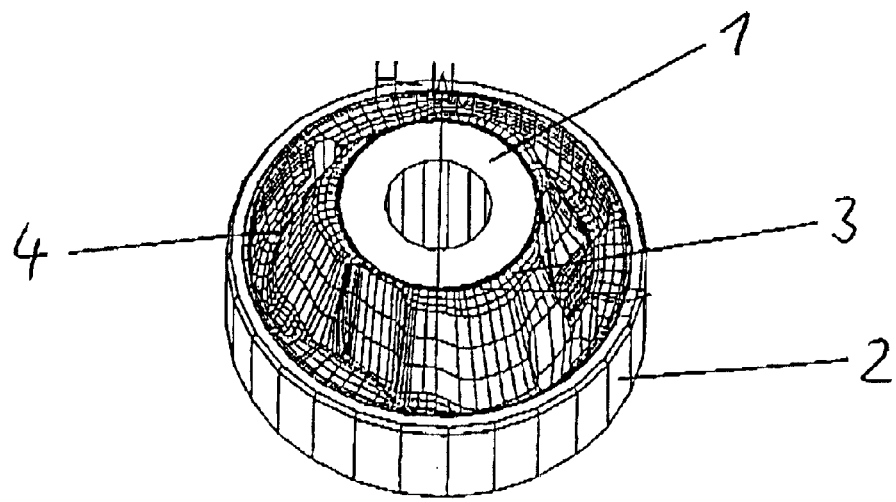

Another embodiment of the bearing according to the present invention is shown in FIG. 2a in a top view from the axial direction, in which section lines extending in different directions are shown with respect to the axial sectional views shown in FIGS. 2c–j. In this example, the course of the contour of the free grooves 4, 4' deviates somewhat from the example shown in FIG. 1. However, the distance between the groove and the bearing axis 5 and the width of the grooves change cyclically in this case as well. This is clearly illustrated once again especially by FIG. 2b. In addition to the free grooves 4, 4', two openings, as a result of which the bearing also has different rigidities with respect to different radial directions, are also provided in the elastomer.

The bearing is once again shown in different sectional views in FIGS. 2c through j, always along the section lines shown in FIG. 2a. This illustrates once again how the two free grooves 4, 4' wind with the defined alternating cycles of their contours between the inner and outer parts 1, 2. The cross bond of the strands 6, 6' forming the pressure body is also clearly recognizable.

Figure 3:
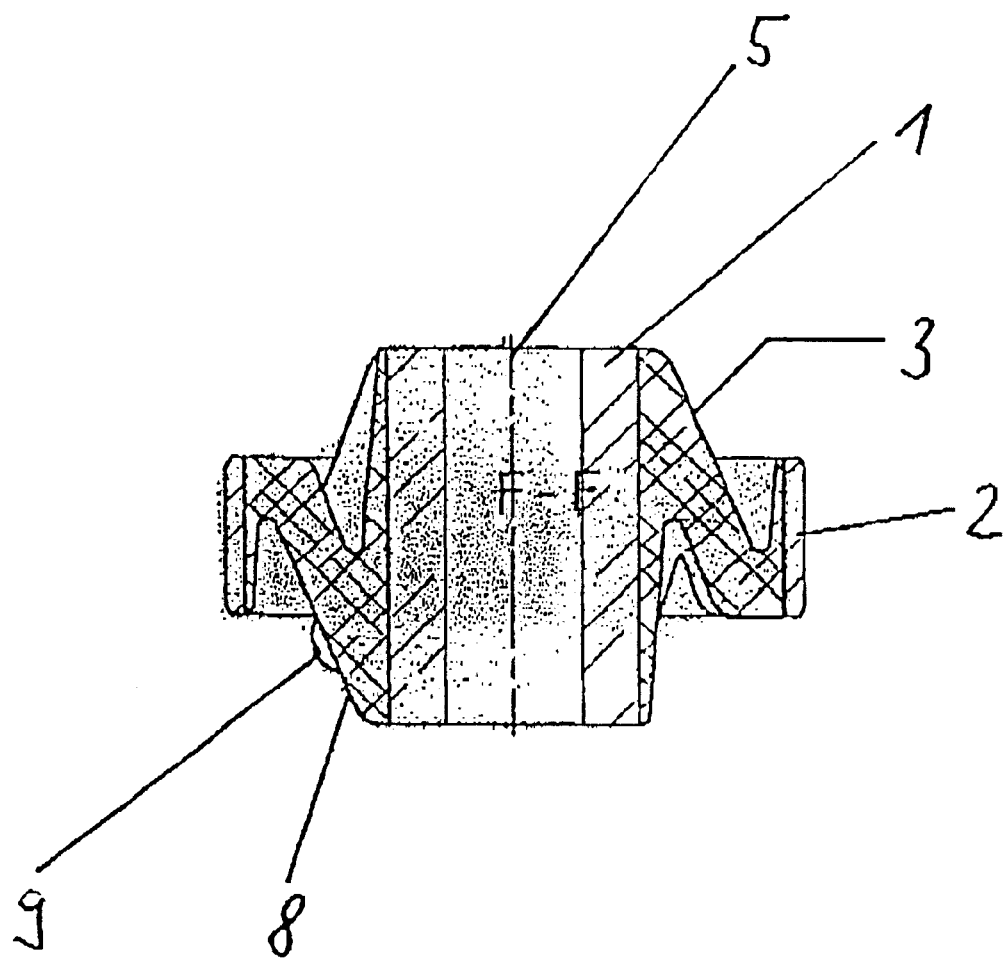
FIG. 3 is an axial section of the bearing with additional local bulges in the area of the inner contour of a free groove.

FIG. 3 shows an advantageous variant of the bearing which is otherwise designed in the same manner as that shown in FIGS. 1 and 2. In this variant of the present invention, local bulges 9 arranged over the circumference are prepared in the area of the webs of the elastomer 3, i.e., in the area surrounding the points of maximum material thickness of the elastomer 3 connected to the inner part 1. Calibration and fine adjustment of the bearing for better stress distribution under load caused by torsion and cardanics can be achieved as a result of these bulges 9.

Figure 4A:
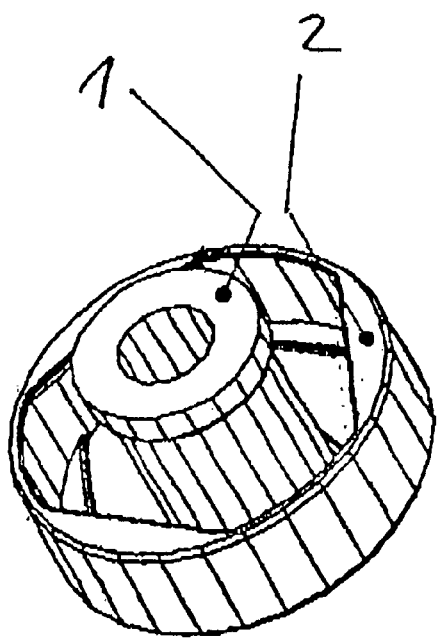
FIG. 4a is an isometric view of a bearing designed according to the present invention with modified shapes for the inner part and the outer sleeve.
Figure 4B:
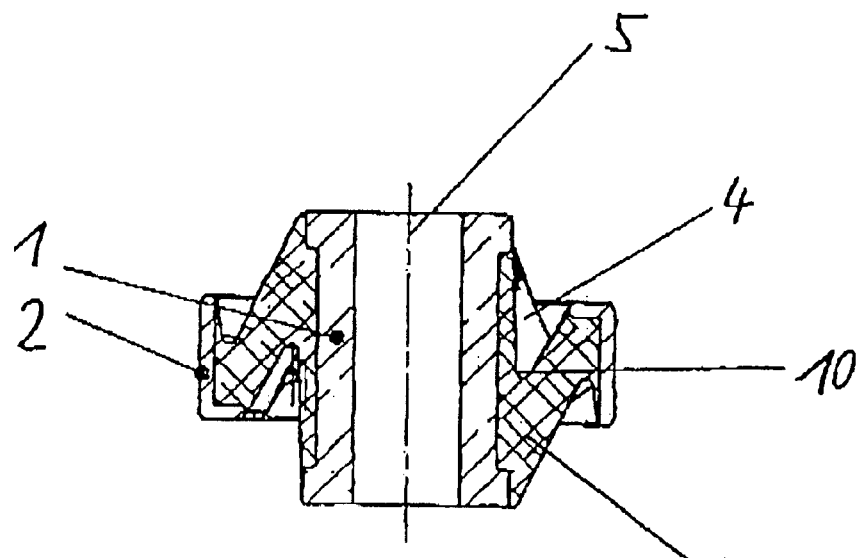

FIGS. 4a and 4b show a design of the bearing according to the present invention in which the insert parts, namely, the shapes of the inner part 1 and the outer sleeve 2, are somewhat modified compared with the embodiments explained above. With the goal of optimal adaptation to the intended use, the characteristics can be additionally influenced as a result and the ratio of the radial rigidity to the axial rigidity may be optionally calibrated in terms of this optimization. In the example being shown, the bottoms 10, 10' of the free grooves 4, 4' are located in one plane, so that no undercut or free space is formed.

The rubber bearing according to the present invention is characterized in that it can be varied within broad limits concerning the ratio of the radial rigidity to the axial rigidity due to its comparatively simple design, which makes do without additional insert parts, without a change in the basic design embodiment. This leads to a simple manufacture and a corresponding reduction in the manufacturing costs. The testing of the characteristics is also simple because the need for additional auxiliary means can be eliminated. This equally applies to the assembly at the customer. Due to the absence of additional insert parts, the bearing has, in addition, a lower weight compared with other prior-art embodiments. Nevertheless, the bearing can absorb high torsional moments and also withstand higher cardanic loads due to long cardanic movements.

While specific embodiments of the invention have been shown and described in detail to illustrate the application of the principles of the invention, it will be understood that the invention may be embodied otherwise without departing from such principles.

What is claimed is:

1. A rubber bearing, comprising:
   an essentially cylindrical inner part;
   a tubular outer sleeve substantially coaxially surrounding said inner part;
   a pressure body formed of an elastomer arranged between said inner part and said outer sleeve and connected to same by vulcanization, said pressure body having two free grooves extending, beginning from axial ends of the bearing, into an interior of the bearing in the axial direction running annularly around a bearing axis, an axial distance of said free grooves from said bearing axis and/or a width of said free grooves continuously changing cyclically, wherein a phase shift of a course between said two free grooves is provided determined by a change in a radial distance from said bearing axis and/or the width, each course following a same cycle, and strands of said elastomer of equal axial loadability in the pressure body form a cross bond such that a ratio of radial rigidity to axial rigidity is variable by setting angles of the strands forming the cross bond in relation to said bearing axis differently and/or by shaping the course of the contours of said free grooves differently.

2. A rubber bearing in accordance with claim 1, wherein an axial depth of both said free grooves relative to a circumference of the bearing is varied and both said free grooves extend into an interior of the bearing beyond an axial center at least in some sections, a phase shift existing between the respective courses of said free grooves being selected to be such that bottoms of said free grooves have a different radial distance from said bearing axis in sections of the circumference of the bearing in which both said free grooves extend beyond the center of the bearing.

3. A rubber bearing in accordance with claim 1, wherein the ratio of the axial rigidity to the radial rigidity can be set in the range of 1:3 to nearly 1:1 by correspondingly setting the angles of said strands forming the cross bond in relation to said bearing axis and/or the geometry of said free grooves.

4. A rubber bearing in accordance with claim 1, wherein cyclically changing a distance between said free grooves and said bearing axis is determined by an approximately sinusoidal course of their inner contour, which is determined by a particular material thickness of the elastomer in an area of connection of said elastomer to said inner part of the bearing.

5. A rubber bearing in accordance with claim 1, wherein cyclically changing a width of said free grooves is determined by an approximately sinusoidal course of an outer contour, which is determined by a particular material thickness of the elastomer in the area of a connection of the elastomer to said outer sleeve of the bearing.

6. A rubber bearing in accordance with claim 1, wherein with constant width, a distance between said free grooves and said bearing axis has an approximately sinusoidal course caused by the outer contour of said free grooves, which contour is determined by the particular material thickness of the elastomer in the area of its connection to said outer sleeve of the bearing, also having a sinusoidal course with a corresponding phase shift in relation to the inner contour.

7. A rubber bearing in accordance with claim 3, wherein a sinusoidal course of an inner and/or an outer contour of said free grooves has at least two cycles, so that there are at least two points of maximum material thickness and two points of minimum material thickness of the elastomer in the area of its connection to said inner part and/or to said outer sleeve in the course of the contour.

8. A rubber bearing in accordance with claim 1, wherein a cross bond between said strands of equal axial loadability is designed such that a first strand of said inner contour of a free groove is connected to one axial end of said inner part of the bearing and said outer sleeve while a second strand of said inner contour of the other free groove is connected to another axial end of said inner part of the bearing and said outer sleeve.

9. A rubber bearing in accordance with claim 1, wherein said pressure body formed by said elastomer has an axially extending openings whereby the bearing has different radial rigidities in the circumferential direction.

10. A rubber bearing in accordance with claim 1, wherein additional bulges are provided locally on said strands which determine said contours of said free grooves.

11. A rubber bearing in accordance with claim 10, wherein said additional bulges are provided on said inner contour of said free grooves in the area surrounding the points of greatest material thickness of said elastomer in the area of the connection of said elastomer to said inner part.

12. A rubber bearing, comprising:
an essentially cylindrical inner part;
a tubular outer sleeve substantially coaxially surrounding said inner part;
a pressure body formed of an elastomer arranged between said inner part and said outer sleeve and connected to same by vulcanization, said pressure body having a plurality of free grooves extending, beginning from axial ends of the bearing, into an interior of the bearing in the axial direction running annularly around a bearing axis, an axial distance of said free grooves from said bearing axis and/or a width of said free grooves continuously changing cyclically, wherein a phase shift of a course between said free grooves is provided determined by a change in a radial distance from said bearing axis and/or the width, and strands of said elastomer of equal axial loadability in the pressure body form a cross bond such that a ratio of radial rigidity to axial rigidity is variable by setting angles of the strands forming the cross bond in relation to said bearing axis differently and/or by shaping the course of the contours of said free grooves differently.

13. A rubber bearing in accordance with claim 12, wherein an axial depth of said free grooves relative to a circumference of the bearing is varied and said free grooves extend into an interior of the bearing beyond an axial center at least in some sections, a phase shift existing between the respective courses of said free grooves being selected to be such that bottoms of said free grooves have a different radial distance from said bearing axis in sections of the circumference of the bearing in which said free grooves extend beyond the center of the bearing.

14. A rubber bearing in accordance with claim 13, wherein the ratio of the axial rigidity to the radial rigidity can be set in the range of 1:3 to nearly 1:1 by correspondingly setting the angles of said strands forming the cross bond in relation to said bearing axis and/or the geometry of said free grooves.

15. A rubber bearing in accordance with claim 13, wherein cyclically changing a distance between said free grooves and said bearing axis is determined by an approximately sinusoidal course of their inner contour, which is determined by a particular material thickness of the elastomer in an area of connection of said elastomer to said inner part of the bearing.

16. A rubber bearing in accordance with claim 13, wherein cyclically changing a width of said free grooves is determined by an approximately sinusoidal course of an outer contour, which is determined by a particular material thickness of the elastomer in the area of a connection of the elastomer to said outer sleeve of the bearing.

17. A rubber bearing in accordance with claim 13, wherein with constant width, a distance between said free grooves and said bearing axis has an approximately sinusoidal course caused by the outer contour of said free grooves, which contour is determined by the particular material thickness of the elastomer in the area of its connection to said outer sleeve of the bearing, also having a sinusoidal course with a corresponding phase shift in relation to the inner contour.

18. A rubber bearing in accordance with claim 13, wherein a cross bond between said strands of equal axial loadability is designed such that a first strand of said inner contour of a free groove is connected to one axial end of said inner part of the bearing and said outer sleeve while a second strand of said inner contour of the other free groove is connected to another axial end of said inner part of the bearing and said outer sleeve.

19. A rubber bearing in accordance with claim 13, wherein said pressure body formed by said elastomer has an axially extending openings whereby the bearing has different radial rigidities in the circumferential direction.

20. A rubber bearing in accordance with claim 12, wherein bulges are provided locally on said strands which determine said contours of said free grooves said bulges being provided on said inner contour of said free grooves in the area surrounding the points of greatest material thickness of said elastomer in the area of the connection of said elastomer to said inner part.

* * * * *